(12) United States Patent
Schutz et al.

(10) Patent No.: US 7,996,682 B2
(45) Date of Patent: Aug. 9, 2011

(54) SECURE PROMPTING

(75) Inventors: Klaus U. Schutz, Kirkland, WA (US); Matthew W. Thomlinson, Seattle, WA (US); Scott A. Field, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/251,946

(22) Filed: Oct. 17, 2005

(65) Prior Publication Data

US 2007/0101148 A1    May 3, 2007

(51) Int. Cl.
*G06F 21/00* (2006.01)

(52) U.S. Cl. ........ 713/182; 713/183; 713/184; 713/185; 713/186; 713/168; 713/169; 713/170; 713/171; 713/172; 713/173; 713/174; 726/2; 726/3; 726/4; 726/5; 726/6; 726/7; 726/8; 726/27; 726/28; 726/29; 726/30; 709/227; 709/228; 709/229

(58) Field of Classification Search .................. 713/150, 713/155–159, 182–186, 168–174; 726/11, 726/14, 15, 20, 27–30, 2–8; 709/201, 203, 709/246, 247
See application file for complete search history.

(56) References Cited

U.S. PATENT DOCUMENTS

| | | | |
|---|---|---|---|
| 4,885,789 A | 12/1989 | Burger et al. | |
| 4,918,653 A | 4/1990 | Johri et al. | |
| 4,945,468 A | 7/1990 | Carson et al. | |
| 6,006,333 A * | 12/1999 | Nielsen | 726/8 |
| 6,389,535 B1 | 5/2002 | Thomlinson et al. | |
| 6,507,909 B1 * | 1/2003 | Zurko et al. | 713/164 |
| 7,036,022 B1 | 4/2006 | Zurko et al. | |
| 7,383,570 B2 * | 6/2008 | Pinkas et al. | 726/2 |
| 2003/0065940 A1 | 4/2003 | Brezak et al. | |
| 2003/0217287 A1 * | 11/2003 | Kruglenko | 713/200 |
| 2004/0221045 A1 | 11/2004 | Joosten et al. | |
| 2005/0188210 A1 * | 8/2005 | Perlin et al. | 713/183 |
| 2005/0193208 A1 * | 9/2005 | Charrette et al. | 713/182 |
| 2007/0101435 A1 * | 5/2007 | Konanka et al. | 726/27 |
| 2008/0214210 A1 | 9/2008 | Rasanen et al. | |

OTHER PUBLICATIONS

Balmer, et al., "Analysis of Terminal Server Architectures for Thin Clients in a High Assurance Network", 23rd National Information Systems Security Conference, 2000. 11 pages.
Mittra, et al., "A Flow-Based Approach to Datagram Security", SIGCOMM 1997, Cannes, France, pp. 221-234.

* cited by examiner

*Primary Examiner* — Taghi T. Arani
*Assistant Examiner* — Josnel Jeudy
(74) *Attorney, Agent, or Firm* — Lee & Hayes, PLLC

(57) ABSTRACT

Techniques are described herein for securely prompting a user to confirm sensitive operations, input sensitive information or the like. The techniques include receiving or intercepting calls from applications to prompting routines. When a call to a prompting routine is received or intercepted a hint may be provided to the user to switch to a secure desktop. When the user switches from the user desktop to the secure desktop the particular prompt is displayed. The input to the prompt is received on the secure desktop and verified to have been provided by the user. The user input or a representation of the input is then returned to the application running on the user desktop. Using these techniques, interception of prompting messages by malware does not result in sensitive information being revealed. Furthermore, spoofing of new messages by malware does not lead to the dismissal of critical prompting.

20 Claims, 3 Drawing Sheets

SECURE PROMPTING

BACKGROUND

Computing devices are subject to ever increasing security risks. To protect against attacks and prevent security breaches, one or more techniques for establishing a level of trust are implemented by computing devices. Typical techniques for establishing a level of trust include prompting a user to confirm that a sensitive operation, such as changing a security setting or installing a new trusted PKI based root certificate, should be performed. Other techniques include prompting a user for credentials, such as user passwords or smartcard PIN number.

Unfortunately, there is no way to distinguish between a legitimate application and a malicious program prompting the user in today's computing platforms. For example, a malicious program may generate a prompt requesting a user to enter their password that appears to have been generated by, and is identical to one of, a legitimate application. In addition, in Windows®, the architecture makes it is possible for a malicious program to monitor Windows messages and user keystrokes for the purpose of intercepting inputs to a legitimate application. Furthermore, it is also possible for that malicious program to programmatically drive a legitimate application, such that the application dismisses user confirmation of sensitive operations. For example, a user may make changes to the security settings of a firewall application. If confirmation is programmatically dismissed the previous security settings are maintained, which may make the computing device vulnerable to attack.

SUMMARY

Techniques are described herein for securely prompting a user to confirm sensitive operations, input sensitive information or the like. The techniques include receiving or intercepting calls from applications to prompting routines. When a call to a prompting routine is received or intercepted a hint may be provided to the user to switch to a secure desktop. When the user switches from the user desktop to the secure desktop the particular prompt is displayed. The input to the prompt is received on the secure desktop and verified to have been provided by the user. The user input or a representation of the input is then returned to the application running on the user desktop. Using these techniques, interception of prompting messages by malware does not result in sensitive information being revealed. Furthermore, spoofing of new messages by malware does not lead to the dismissal of critical prompting.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

DETAILED DESCRIPTION OF THE INVENTION

Figure 1:
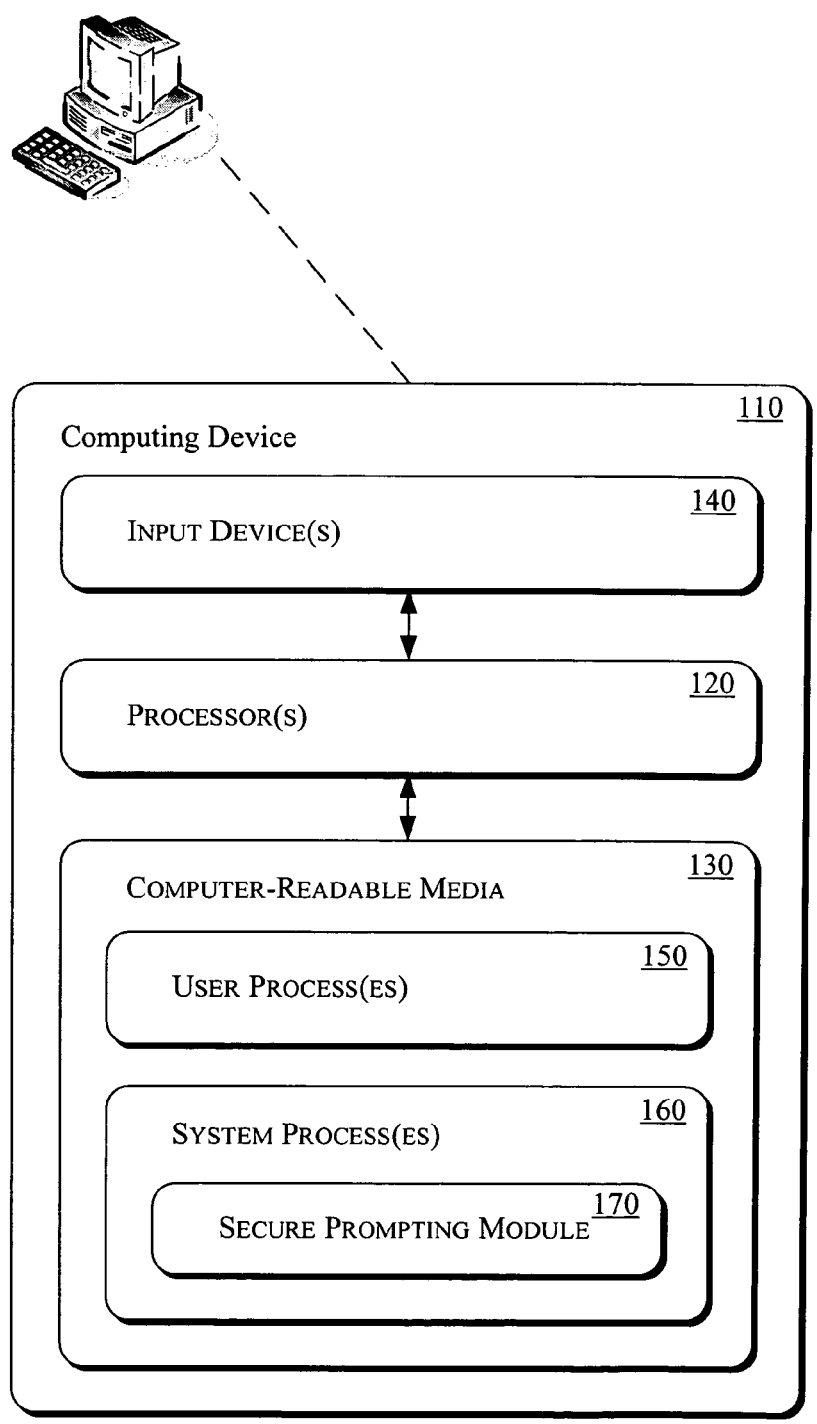
FIG. 1 is a block diagram of a computing device for implementation a secure prompting technique.

FIG. 1 shows a computing device 110 for implementing a secure prompting technique. The computing device 110 includes one or more processors 120 communicatively coupled to one or more computer-readable media 130 and one or more input devices 140. The processors 120 are capable of executing instructions stored on the computer-readable media 130. The instructions implement one or more user processes 150 and one or more system processes 160. The user processes may implement applications such as browsers, word processing applications, database application, multimedia players and/or the like. The system processes may implement the operating system, input/output device drivers and/or the like. One of the system processes 160 in particular implements a secure prompting module 170.

Figure 2:
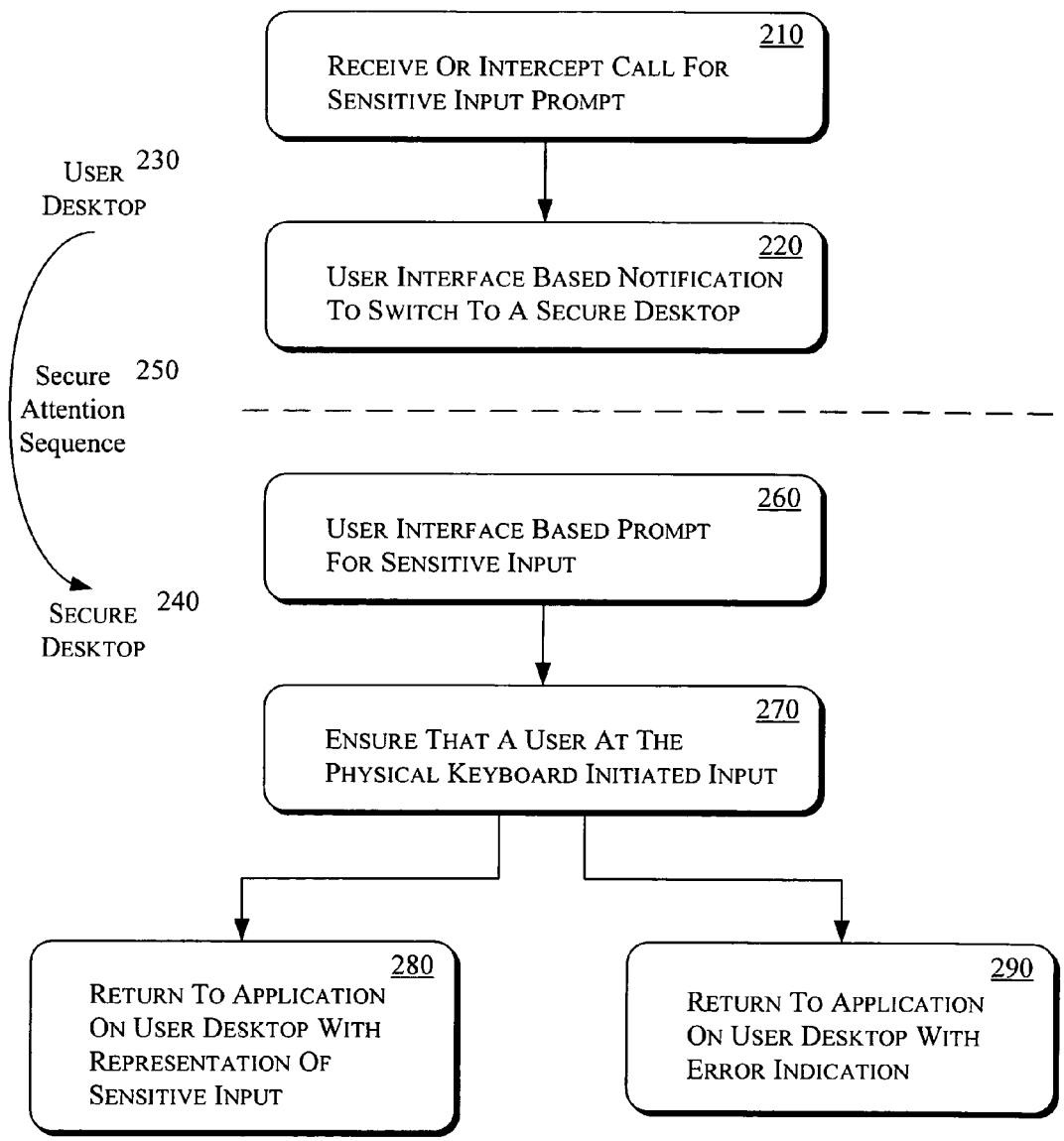
FIG. 2 is a flow diagram of a secure method of prompting.

For discussion purposes, the operation of the computing device 110 is further described herein with reference to the secure method of prompting 200 shown in FIG. 2. It should be appreciated that the steps of method 200 can be performed by software, hardware, firmware or any combination. Although specific steps are disclosed in method 200, such steps are exemplary. That is, the method 200 is well suited to performing various other steps or variations of the steps recited in FIG. 2. Similarly, although specific components are disclosed in computing device 110, such components are exemplary. That is, the computing device 110 is well suited to being implemented using various other component or variations of the components shown in FIG. 1.

The user processes 120 run on a user desktop 230 (e.g., application desktop) and the system processes run on a secure desktop 240 (e.g., winlogon desktop). The user desktop 230 is used to run applications, whereas the secure desktop 240 is used to run secrets (e.g., passwords, pins) or display trustworthy information. The secure desktop 240 is created upon startup of the computing device 110 and is used for interactive identification and authentication and other secure dialogs. Access to the secure desktop 240 is limited to the operating system kernel layer. The user desktop 230 is created each time a user successfully logs on and is where all user activity takes place. The user desktop 230 is also protected, with access to the user desktop 230 limited to the particular interactive logon session and the operating system kernel. However, there is minimal protection between applications sharing the user desktop.

The secure prompting module 170 receives or intercepts calls for prompts generated by the user processes 150, at 210. In one implementation, applications call a standard routine to generate a prompt for user inputs. These calls are intercepted to enable use of the secure prompting techniques with legacy applications. However, new applications may be written to directly call the secure prompting module 170 to provide the prompt.

When a call for a prompt is received or intercepted, the secure prompting module 170 provides a hint to the user to switch from the user desktop to a secure desktop, at 220. For example, a visual and/or audible message may be issued indicating that the user should switch to the secure desktop. The user switches from the user desktop 230 to the secure desktop 240 using a unique input that is physically entered by the user (e.g., secure attention sequence). The unique input is captured by the secure prompting module 170 running on the secure desktop 240 and cannot be monitored, simulated or changed by applications running on the user desktop 230.

Once the user switches to the secure desktop 240, the secure prompting module 170 prompts the user for the input or operation, at 260. The prompt can be for a sensitive input, which includes any form of secret or confidential information input by the user into the computing device 100. The prompt can also be for performing a sensitive operation, which includes any change of state or a setting of the computing device 110, user process 150 and/or system process 160. The sensitive input or operation may include for example requesting confirmation of changes to security settings, requesting confirmation when installing of a new trusted PKI based root certification, requesting input of a user password or other credential, and the like.

The security module 170, at 270, ensures that an appropriate input device (e.g., keyboard, pointing device, microphone, USB fob, fingerprint reader and the like) provided the input to the prompt. The source of the input can be ensured because the device drivers operate in the protected mode of the operating system kernel layer. Ensuring that the input was received on an appropriate input device physically operable by the user intrinsically authenticates that the input was provided by a user and not generated by software.

If the input is confirmed to have been entered by the user, execution control is returned to the user desktop 230, at 280. A representation of the input may be passed to the user desktop 230 when execution control is returned from the secure desktop 240. In one implementation, the representation of the input may be an authentication certificate, a status code, a one-way cryptographic hash of the sensitive input or the like. However if the input cannot be verified to have been entered on an appropriate user operable input device, an exception or error code may be returned, the input process may be terminated, and/or the like, at 290.

Accordingly, sensitive inputs and operations requested by applications are received and the source thereof is authenticated on the secure desktop. Consequently, a malicious program cannot acquire sensitive information in response to generating a prompt that appears to be from a legitimate application. In addition, it is not possible for a malicious program to monitor messages and user keystrokes, for the purpose of intercepting inputs to a legitimate application. Furthermore, it is also not possible for a malicious program to programmatically confirm or dismiss the confirmation prompt for sensitive operations.

Figure 3:
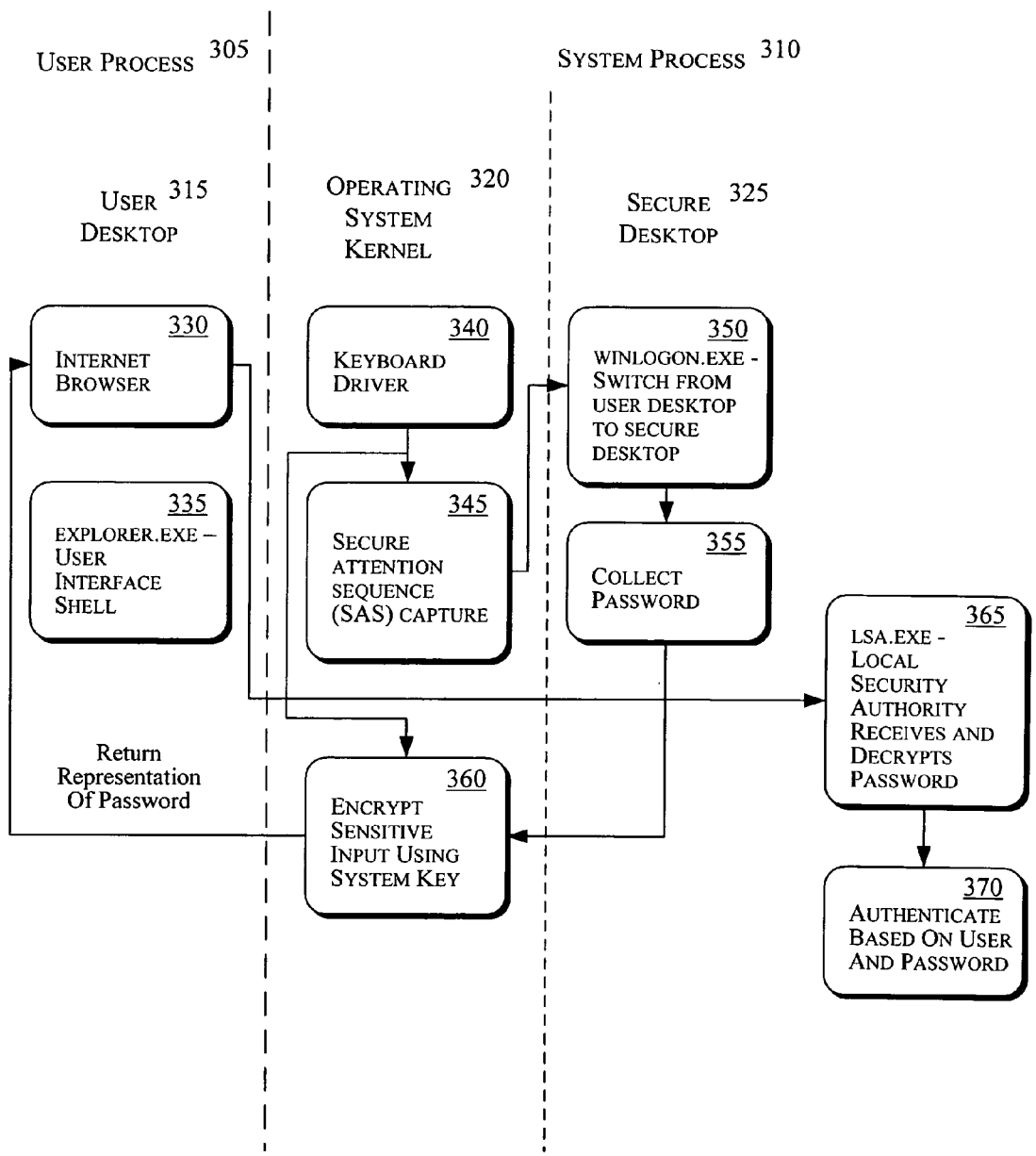
FIG. 3 is a block diagram of an exemplary secure prompting technique.

Referring now to FIG. 3, an exemplary technique of securely prompting a user 300 is shown. The technique is described with reference to a Windows® operating system based computing device. In particular, the technique involves a plurality of user processes 305 and a plurality of system processes 310. The user processes 305 are executing in the context of a user desktop 315, and the system processes 310 are executing in the context of an operating system kernel 320 and a secure desktop 325.

The technique is invoked when a user process running on the user desktop 315 prompts a user for a sensitive input or a sensitive operation. For example, an online banking application running through an internet browser 330 may request input of a user name and password. The call to the routine that generates a dialog box for prompting a user for the password is intercepted or the call may be made directly to the secure prompting routine running on the secure desktop 325. Intercepting the call is utilized for legacy applications that use the conventional process of calling to a user interface based prompting routine for generating the input dialog box, such as the explorer.exe module 335. In the future, however, the applications may be coded to directly call the secure prompting process on the secure desktop 325.

The user interface shell used to prompt the user is provided by explorer.exe module 335, which is a process that runs automatically at startup and remains an active process. The explorer.exe module 335 also hosts the start menu, taskbar, desktop and file manager. In response to the call from the browser 330, the explorer.exe module 335 displays a hint to the user that a message is waiting for the user on the secure desktop 325. For example, a pop-up balloon may be output by the explorer.exe module 335 that says "There is a message on the secure desktop." In another implementation, the user may switch from the normal desktop to the secure desktop without being prompted. For example, a user wanting to do their on-line banking may know, without being prompted, that the logon process requires that they switch to the secure desktop 325 to enter their user name and password.

The user may switch from the user desktop 315 to the secure desktop by utilizing a particular key stroke sequence that is monitored and recognized by the operating system kernel layer 320. For example, the user may switch from the user desktop 315 to the secure desktop 325 by entering a secure attention sequence (SAS) using the keyboard. The operating system kernel 320 captures the secure attention sequence (e.g., Ctrl+Alt+Delete) 345 and notifies the winlogon.exe process 350. The winlogon.exe routine 350 manages the secure desktop 325.

In response to detection of the secure attention sequence 345, the winlogon.exe routine 350 switches operation from the user desktop 315 to the secure desktop 325. It is appreciated that there are visual differences between the user desktop 315, on which all user application run, and the secure desktop 325. Therefore, the user can clearly distinguish both. Furthermore, when the secure attention sequence is entered, the user can see the desktops switch. The winlogon.exe routine 350 also calls a user interface shell executing on the secure desktop 325 to prompt the user for the password 355. The keyboard driver 340 detects the password entered by the user at the keyboard. The password collected on the secure desktop is encrypted 360 at the operating system kernel layer 320 and the result is returned to the internet browser application 330. The password may be encrypted using a system key, session key, public key or the like.

Accordingly, a trusted communication channel is established between an appropriate input device operable by the user and the operating system kernel layer 320. The trusted communication channel ensures that the password was entered by the user at the keyboard. In addition to establishing that the user entered the sensitive input, the technique may also verify that the sensitive input is correct. For example, the encrypted password may be passed by the browser 330 to the Local Security Authority 365 (e.g., lsass.exe) which decrypts the password and authenticates the user 370 based upon the user identifier and the decrypted password.

Consequently, sensitive inputs are received, verified as being entered by the user, and encrypted by the operating system kernel and processes running on the secure desktop. In addition, it is difficult for a malicious program running on the user desktop to monitor messages and user keystrokes at the operating system kernel or on the secure desktop. The malicious program also cannot decrypt the input returned to the user desktop. Therefore, it is difficult for a malicious program to programmatically dismiss the confirmation of sensitive operations and/or acquire unencrypted sensitive information.

Although techniques for securely prompting a user have been described in language specific to structural features and/or methods, it is to be understood that the subject of the appended claims is not necessarily limited to the specific features or methods described. Rather, the specific features and methods are disclosed as exemplary implementations of secure prompting techniques.

What is claimed is:

1. A computer implemented method under control of a processor communicatively coupled to an input device, comprising:

intercepting a prompt from an application running on a user desktop, the prompt requesting sensitive information, the user desktop created each time a user successfully logs on to a particular interactive logon session, wherein access to the user desktop is limited to the particular interactive logon session and an operating system kernel;

responsive to intercepting the prompt from the application, issuing a hint to the user to switch to a secure desktop, wherein the secure desktop limits access to a kernel layer of the operating system;

switching from the user desktop to the secure desktop in response to a unique input physically entered by the user on an input device, and drivers of the input device operate in a protected mode of the operating system kernel layer, wherein the secure desktop is presented such that there are visual differences between the user desktop and the secure desktop;

capturing the unique input in a secure prompting module running on the secure desktop, wherein the secure prompting module cannot be monitored, simulated, or changed by applications running on the user desktop;

displaying the prompt on the secure desktop;

receiving the sensitive information physically entered by the user from the input device in response to the prompt on the secure desktop;

authenticating that the sensitive information was physically entered by the user, wherein the authenticating comprises ensuring that an appropriate input device provided the information;

encrypting the sensitive information in the operating system kernel; and returning a representation of the sensitive information to the application running on the user desktop, wherein the representation is selected from the group consisting of an authentication certificate, a status code, a one-way cryptographic hash of the sensitive information.

2. A computer implemented method according to claim 1, wherein the sensitive information comprises secret or confidential information input by the user into the computing device.

3. A computer implemented method according to claim 1, wherein the prompt requests confirmation of a sensitive operation.

4. A computer implemented method according to claim 3, wherein the sensitive operation comprises changing a setting of the computing device.

5. A computer implemented method according to claim 4, wherein the sensitive operation comprises a change of state of the computing device.

6. One or more computer-readable memory having instructions stored thereon computer-executable instructions that, when executed on one or more processors, cause the one or more processors to perform acts comprising:

receiving a call from an application running on a user desktop to generate a user prompt;

detecting, in an operating system kernel layer, a unique input that is physically entered by a user on an input device, the unique input initiating a switch to a secure desktop;

switching from the user desktop to the secure desktop in response to detecting the unique input physically entered by the user on the input device, the input device including drivers to operate in a protected mode of an operating system kernel layer, wherein the secure desktop is presented such that there are visual differences between the user desktop and the secure desktop;

displaying the user prompt on the secure desktop;

receiving a sensitive input to the user prompt on the secure desktop;

ensuring that a source of the sensitive input was a user operated input device, wherein a device driver for the user operated input device operates in the protected mode of the operating system kernel layer;

encrypting the sensitive input by the operating system kernel layer and one or more processes running on the secure desktop to monitor messages; and returning a representation of the sensitive input to the application running on the user desktop.

7. One or more computer-readable memory according to claim 6, wherein the unique input physically entered by the user comprises a secure attention sequence.

8. One or more computer-readable memory according to claim 7, wherein the secure attention sequence is captured by an operating system kernel level process.

9. One or more computer-readable memory according to claim 7, wherein the secure attention sequence is not visible to applications on the user desktop.

10. An apparatus, comprising:

a processor;

memory communicatively coupled to the processor; and one or more input devices communicatively coupled to the processor;

wherein the apparatus is adapted to perform operations comprising:

detecting a secure attention sequence from a user desktop;

switching the apparatus from the user desktop to a secure desktop, in response to the secure attention sequence wherein the user desktop is created each time the user successfully logs on to an interactive logon session, and access to the user desktop is limited to the particular interactive logon session and an operating system kernel, wherein access to the secure desktop is limited to the operating system kernel layer;

displaying a prompt on the secure desktop for a sensitive input, wherein the secure desktop is displayed such that there are visual differences between the user desktop and the secure desktop, and the prompt cannot be monitored, simulated, or changed by an application running on the user desktop;

receiving the sensitive input in the secure desktop in response to the prompt;

authenticating that the sensitive input was physically entered by a user, wherein the authenticating comprises ensuring that the sensitive input was received from an input device of the one or more input devices communicatively coupled to the processor operated by the user;

in an event that the sensitive input is not received from the user operating the input device, returning an error indication to the application on the user desktop and terminating the entering of the sensitive input;

encrypting the sensitive input in an operating system kernel; and returning a representation of the sensitive input to the application running on the user desktop.

11. An apparatus according to claim 10, wherein the input device operated by the user is one or more devices selected from the group consisting of a keyboard, a pointing device, a microphone, a USB fob, and a fingerprint reader.

12. An apparatus according to claim 10, further comprising intercepting a call for the prompt from an application running on the user desktop.

13. An apparatus according to claim 10, further comprising receiving a call for the prompt from an application running on the user desktop.

14. An apparatus according to claim 10, further comprising issuing a hint to the user to switch to the secure desktop, the hint comprising a visual message.

15. A computer implemented method according to claim 1, further comprising terminating a process associated with the sensitive input, in an event that the sensitive input was not physically entered by the user from the input device.

16. A computer implemented method according to claim 1, wherein the unique input physically entered by the user on the input device enables the user to switch from the user desktop to the secure desktop without first intercepting the prompt requesting sensitive information.

17. A computer implemented method according to claim 1, wherein the hint comprises a visual message.

18. One or more computer-readable media as recited in claim 6, further comprising, in an event that the source of the sensitive input was not the user operated input device, returning an error indication and terminating a process associated with the sensitive information.

19. A computer implemented method according to claim 1, wherein the hint comprises an audible message.

20. An apparatus according to claim 10, further comprising issuing a hint to the user to switch to the secure desktop, the hint comprising an audible message.

* * * * *